(12) United States Patent
Kato et al.

(10) Patent No.: US 10,661,739 B2
(45) Date of Patent: May 26, 2020

(54) STRUCTURE OF COMPONENT ASSEMBLED PART

(71) Applicant: TOYOTA JIDOSHA KABUSHIKI KAISHA, Toyota-shi, Aichi-ken (JP)

(72) Inventors: Masanobu Kato, Okazaki (JP); Tomoaki Akasaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/100,725

(22) Filed: Aug. 10, 2018

(65) Prior Publication Data

US 2019/0061659 A1 Feb. 28, 2019

(30) Foreign Application Priority Data

Aug. 22, 2017 (JP) ................................ 2017-159258

(51) Int. Cl.
*B60R 19/02* (2006.01)
*B60R 19/18* (2006.01)
*B60R 19/48* (2006.01)

(52) U.S. Cl.
CPC ............ *B60R 19/023* (2013.01); *B60R 19/18* (2013.01); *B60R 19/48* (2013.01); *B60R 19/483* (2013.01); *B60R 2019/1886* (2013.01)

(58) Field of Classification Search
CPC ... B60R 19/48; B60R 19/483; B60R 21/0136; B60R 19/18; B60R 19/50; B60R 2019/1886; B60R 19/52; B60R 21/34
USPC ... 293/117, 102, 115, 120, 133, 155, 1, 106, 293/113, 118, 119, 128; 29/428, 401.1, 29/525.01, 897.1; 224/404, 42.12, 42.23, 224/489, 503, 504, 512, 533, 917.5
See application file for complete search history.

(56) References Cited

U.S. PATENT DOCUMENTS

| 6,939,029 | B1 * | 9/2005 | Stahel | .................. | B60Q 1/2696 |
| | | | | | 362/545 |
| 6,964,441 | B2 * | 11/2005 | Ariga | ...................... | B60R 19/18 |
| | | | | | 293/117 |
| 8,128,139 | B2 * | 3/2012 | Stoffel | ................. | B60Q 1/0433 |
| | | | | | 293/117 |
| 8,678,454 | B2 * | 3/2014 | Abe | ........................ | B60R 19/50 |
| | | | | | 293/115 |

(Continued)

FOREIGN PATENT DOCUMENTS

JP 2000-93235 A 4/2000

*Primary Examiner* — D Glenn Dayoan
*Assistant Examiner* — Sunsurraye Westbrook
(74) *Attorney, Agent, or Firm* — Oliff PLC (57) ABSTRACT

A structure of a component assembled part includes a bracket provided in a first component, and a cover part provided in a second component. The cover part includes an internal space configured such that the bracket is inserted up to a predetermined insertion position so as to cover the bracket from a front side of the bracket to a back side of the bracket when the first component and the second component are assembled to each other. The cover part includes an opening, which allows the internal space of the cover part and an outside of the cover part to communicate with each other, at a position corresponding to a tip portion of the bracket in a state where the bracket is inserted into the internal space of the cover part up to the predetermined insertion position.

5 Claims, 7 Drawing Sheets

(56) References Cited

U.S. PATENT DOCUMENTS

| | | | |
|---|---|---|---|
| 2009/0267364 A1* | 10/2009 | Crainic | B60Q 1/0408 293/117 |
| 2014/0138964 A1* | 5/2014 | Shin | B25J 19/0091 293/117 |
| 2016/0129867 A1* | 5/2016 | Cepollaro | B60R 19/50 293/117 |

* cited by examiner

FIG. 8

STRUCTURE OF COMPONENT ASSEMBLED PART

INCORPORATION BY REFERENCE

The disclosure of Japanese Patent Application No. 2017-159258 filed on Aug. 22, 2017 including the specification, drawings and abstract is incorporated herein by reference in its entirety.

BACKGROUND

1. Technical Field

The present disclosure related to a structure of a component assembled part in which two components are integrally assembled to each other. Particularly, the present disclosure relates to improvements in a structure in which a first component and a second component are assembled to each other in a state where a bracket provided in the first component is inserted into an internal space of a cover part provided in the second component up to a predetermined insertion position, and the cover part covers the bracket.

2. Description of Related Art

In the related art, as a structure in which two components are integrally assembled to each other in various products, there is known a structure in which a first component and a second component are assembled to each other in a state where a bracket provided in one component (hereinafter referred to as the first component) is inserted into an internal space of a cover part provided in the other component (hereinafter referred to as the second component) up to a predetermined insertion position, and the cover part covers the bracket.

For example, a structure in which the second component (referred to as a side bumper in Japanese Unexamined Patent Application Publication No. 2000-93235 (JP 2000-93235 A)) is screw-fastened to the first component (referred to as a body in JP 2000-93235 A) is disclosed in JP 2000-93235 A. Specifically, an inner surface (a surface that faces the first component) of the second component is provided with an upper butting part and a lower latched part that protrudes with a predetermined spacing in an upward-downward direction, and the second component is combined with the first component such that a bracket attached to the first component is inserted between the butting part and the latched part (the bracket is covered with the butting part and the latched part (equivalent to the cover part)). By inserting the bracket of the first component between the butting part and the latched part of the second component as mentioned above, the second component is assembled to the first component by screw fastening in a state where the relative position of the second component with respect to the first component is appropriately obtained.

SUMMARY

However, in the structure disclosed in JP2000-93235A, the aforementioned respective parts are covered with the second component during the work of inserting the bracket of the first component between the butting part and the latched part of the second component. Therefore, whether or not the bracket of the first component is appropriately inserted between the butting part and the latched part of the second component cannot be determined by a worker's visual inspection. That is, even in a state where the bracket of the first component is located below the latched part of the second component and cannot be inserted between the butting part and the latched part of the second component (in other words, even in a state where the bracket of the first component is not appropriately inserted into the internal space of the cover part of the second component), a state where the bracket cannot be inserted between the butting part and the latched part of the second component cannot be checked by the worker's visual inspection. For that reason, it is difficult to ascertain that the relative position of the second component with respect to the first component is not appropriately obtained.

The present disclosure provides a structure of a component assembled part capable of easily determining whether or not a bracket of a first component is appropriately inserted into an internal space of a cover part of a second component.

An aspect of the present disclosure relates to a structure of a component assembled part. The structure includes a bracket provided in a first component, and a cover part provided in a second component. The cover part includes an internal space configured such that the bracket is inserted up to a predetermined insertion position so as to cover the bracket from a front side of the bracket to a back side of the bracket when the first component and the second component are assembled to each other. The cover part includes an opening, which allows the internal space of the cover part and an outside of the cover part to communicate with each other, at a position corresponding to a tip portion of the bracket in a state where the bracket is inserted into the internal space of the cover part up to the predetermined insertion position.

As mentioned above, the tip portion of the bracket abuts against both the outer portions of the opening provided in the cover part in a state where the bracket provided in the first component is appropriately inserted into the internal space of the cover part provided in the second component during the work of assembling the first component and the second component to each other. As a result, a worker can view the tip portion of the bracket through the opening from the outside of the cover part. That is, it is possible to easily check that the bracket is appropriately inserted into the internal space of the cover part. On the contrary, in a case where the tip portion of the bracket cannot be viewed through the opening from the outside of the cover part, it is possible to determine that the bracket is not inserted into the internal space of the cover part up to the predetermined insertion position and the relative position between the sensor supporting member and the bumper body is not appropriately obtained. In this case, the relative positions between the first component and the second component are adjusted such that the relative positions between the first component and the second component are appropriately obtained (the tip portion of the bracket can be viewed through the opening from the outside of the cover part). As mentioned above, according to the aspect of the present disclosure, the worker can easily determine whether or not the bracket of the first component is appropriately inserted into the internal space of the cover part of the second component (whether or not the relative positions between the first component and the second component are appropriately obtained).

In the structure according to the aspect of the present disclosure, the bracket and the cover part may include fastening holes, respectively. The fastening hole of the bracket and the fastening hole of the cover part may be disposed so as to be aligned with each other in a state where the bracket is inserted up to the predetermined insertion position of the cover part.

According to the aspect of the present disclosure, when the bracket is inserted up to the predetermined insertion position of the cover part in a state where the tip portion of the bracket can be viewed through the opening of the cover part, the fastening hole of the bracket and the fastening hole of the cover part are brought into the mutually aligned state. By inserting a fastener into both the fastening holes in the aforementioned state, the bracket and the cover part can be integrally assembled. As mentioned above, by viewing the tip portion of the bracket through the opening of the cover part and inserting the bracket until the tip portion of the bracket reaches the predetermined insertion position of the cover part, the fastening hole of the bracket and the fastening hole of the cover part can be aligned with each other, and the aforementioned alignment work can be simplified.

In the structure of the component assembled part according to the aspect of the present disclosure, the cover part may include a first plate part that extends in a direction orthogonal to an insertion direction of the bracket with respect to the internal space of the cover part, and a second plate part that extends parallel to the insertion direction in which the bracket is inserted into the internal space from a tip part of the first plate part and that overlaps an outer surface of the bracket in a state where the cover part covers the bracket. The opening may be disposed in at least one of the first plate part and the second plate part.

The position of the opening is set in accordance with the direction of a sight line of a worker who performs the assembling work between the first component and the second component. That is, the position of the opening is set to a position where viewing of the tip portion of the bracket in a state where the bracket is appropriately inserted into the internal space of the cover part becomes easy. Particularly, in a case where the openings are provided in both the first plate part and the second plate part, it is possible to view the tip portion of the bracket through the opening even from any direction of a side (for example, a horizontal direction side) where the first plate part is disposed and a side (for example, an upper side) where the second plate part is disposed, and the visibility of the tip portion of the bracket in a case where the bracket is appropriately inserted into the internal space of the cover part can be enhanced.

In the structure of the component assembled part according to the aspect of the present disclosure, the first plate part may include an abutment part against which the tip portion of the bracket abuts when the bracket is inserted up to the predetermined insertion position of the cover part. The openings may be are disposed at both outer positions of the abutment part of the first plate part with respect to a direction orthogonal to the insertion direction of the bracket.

According to the aspect of the present disclosure, when the bracket is inserted up to the predetermined insertion position of the cover part, the tip portion of the bracket abuts against the abutment part of the first plate part, and thereby, the insertion position of the bracket is positioned, and the worker views the tip portion of the bracket through the openings disposed at both the outer positions of the abutment part of the first plate part. As a result, it is possible to check that the bracket is inserted up to the predetermined insertion position of the cover part. That is, during the work of assembling the first component and the second component to each other, the bracket reaches the predetermined insertion position of the cover part by inserting the bracket until the tip portion of the bracket abuts against the abutment part of the first plate part. Hence, whether or not the bracket reaches the predetermined insertion position of the cover part can be checked by viewing through the openings.

In the structure of the component assembled part according to the aspect of the present disclosure, the first plate part may include an abutment part against which the tip portion of the bracket abuts when the bracket is inserted up to the predetermined insertion position of the cover part. The tip portion of the bracket may be configured to have, in a linear shape, a predetermined width dimension in the direction orthogonal to the insertion direction of the bracket with respect to the internal space of the cover part. A width dimension of the opening in the direction orthogonal to the insertion direction of the bracket may be shorter than the width dimension of the tip portion of the bracket in the direction orthogonal to the insertion direction of the bracket.

According to the aspect of the present disclosure, when the bracket is inserted up to the predetermined insertion position of the cover part, both end portions of the tip portion of the bracket abut against both the outer portions of the opening in the first plate part of the cover part, and thereby, the insertion position of the bracket is positioned, and the worker views the tip portion of the bracket through the opening. As a result, it is possible to check that the bracket is inserted up to the predetermined insertion position of the cover part. That is, also in the aspect of the present disclosure, during the work of assembling the first component and the second component to each other, the bracket reaches the predetermined insertion position of the cover part by inserting the bracket until the tip portion of the bracket abuts against the first plate part. Hence, whether or not the bracket reaches the predetermined insertion position of the cover part can be checked by viewing through the openings.

In the aspect of the present disclosure, with respect to the structure of the component assembled part which includes a bracket provided in a first component, and a cover part provided in a second component and in which the cover part includes an internal space configured such that the bracket is inserted up to a predetermined insertion position so as to cover the bracket from a front side of the bracket to a back side of the bracket when the first component and the second component are assembled to each other, the cover part includes an opening, which allows the internal space of the cover part and an outside of the cover part to communicate with each other, at a position corresponding to a tip portion of the bracket in a state where the bracket is inserted into the internal space of the cover part up to the predetermined insertion position. As mentioned above, the worker can easily determine whether or not the bracket of the first component is appropriately inserted into the internal space of the cover part of the second component by viewing (whether or not the relative positions between the first component and the second component are appropriately obtained).

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, embodiments of the present disclosure is described with reference to the drawings. In the present embodiment, a case where the present disclosure is applied to a portion (component assembled part) in which a sensor supporting member is assembled to a rear bumper body, in a rear bumper provided in an automobile, will be described.

Figure 1:
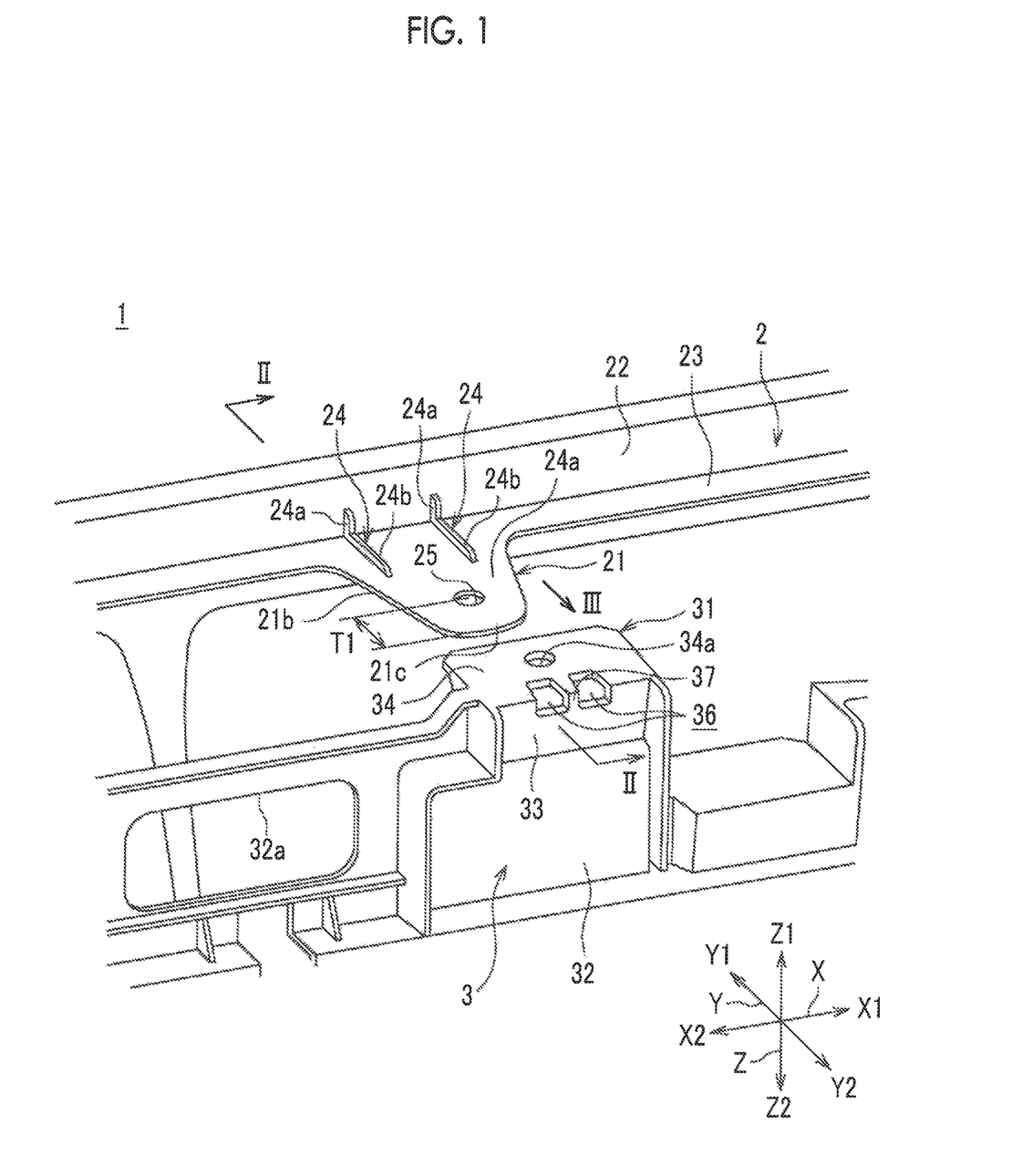
FIG. 1 is a perspective view illustrating the periphery of a bracket of a bumper body and the periphery of a cover part of a sensor supporting member and illustrating a state before the bracket is inserted into an internal space of the cover part up to a predetermined insertion position.
Figure 2:
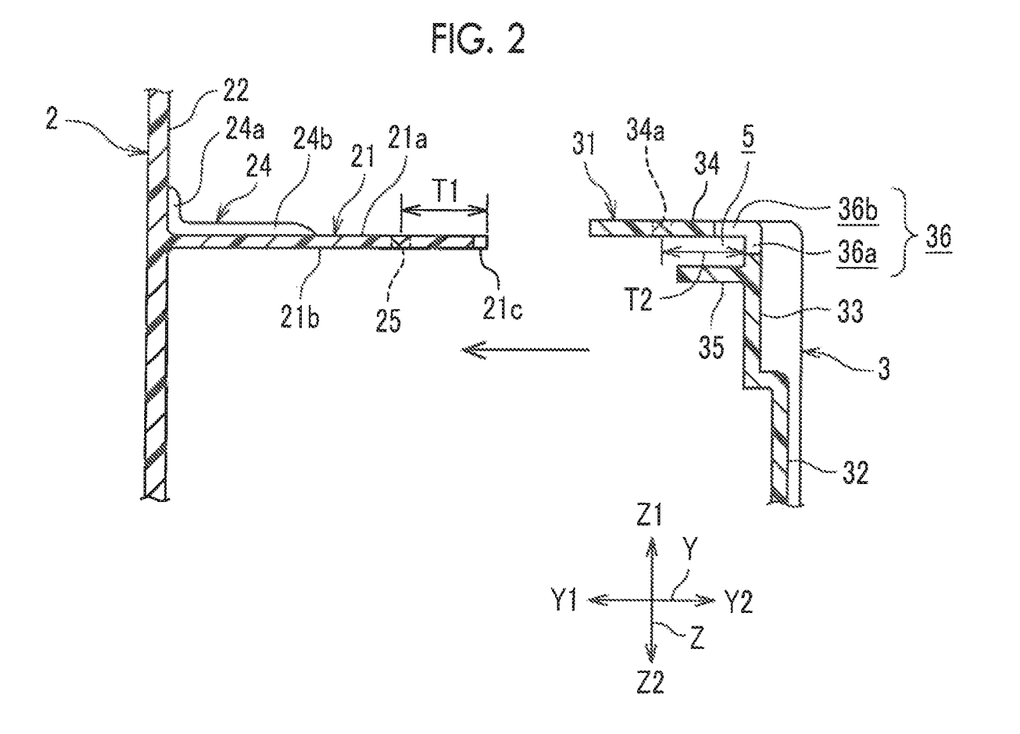
FIG. 2 is a sectional view taken along line II-II in FIG. 1.

FIG. 1 is a perspective view illustrating the periphery of a bracket 21 of a bumper body 2 (first component) and the periphery of a cover part 31 of a sensor supporting member 3 (second component) and illustrating a state before the bracket 21 is inserted into an internal space of the cover part 31 up to a predetermined insertion position. FIG. 2 is a sectional view taken along line II-II in FIG. 1.

In the following, a horizontal direction (a substantially rightward-leftward direction in FIG. 1) in a longitudinal direction of a bumper body 2 and a sensor supporting member 3 is defined as an X direction. A width direction (a direction orthogonal to a plane in FIG. 1, a rightward-leftward direction in FIG. 2) of the bumper body 2 and the sensor supporting member 3 in the horizontal direction orthogonal to the X direction is defined as a Y direction. A vertical direction is defined as a Z direction. In the X direction, a right side in FIG. 1 is referred to as an X1-direction side, and a left side in FIG. 1 is referred to as an X2-direction side. In the Y direction, a deep side in FIG. 1 and a left side in FIG. 2 are referred to as a Y1-direction side, and a front side in FIG. 1 and a right side in FIG. 2 are referred to as a Y2-direction side. In the Z direction, upper sides in FIGS. 1 and 2 are referred to as a Z1-direction side, and lower sides in FIGS. 1 and 2 are referred to as a Z2-direction side.

As illustrated in FIGS. 1 and 2, the rear bumper 1 includes the bumper body 2, and the sensor supporting member 3 assembled to a back side (Y2-direction side) of the bumper body 2. Both the bumper body 2 and the sensor supporting member 3 are made of resin-molded products. Hereinafter, the respective components are described.

Bumper Body

A back surface 22 of the bumper body 2 is provided with a horizontal flange part 23 that protrudes in the horizontal direction (the front side in FIG. 1; the Y2-direction side). The bracket 21 is integrally formed in a portion of the horizontal flange part 23 in the longitudinal direction (X direction). Brackets 21 are formed at a plurality of positions of the horizontal flange part 23 (FIG. 1 illustrates solely one bracket 21) in the longitudinal direction (X direction).

The shape of the bracket 21 is a shape that protrudes toward a side (the front side in FIG. 1 and the right side in FIG. 2; the Y2-direction side) to which the sensor supporting member 3 is assembled. The width dimension (the width dimension in the X direction) of the bracket 21 gradually becomes smaller toward the protruding side (Y2-direction side). An outer edge of a tip portion 21c (a tip portion on the Y2-direction side) of the bracket 21 has a substantially circular-arc shape in a plan view.

Two reinforcing ribs 24 are integrally formed over the bracket 21 and the back surface 22 of the bumper body 2. Each reinforcing rib 24 includes a vertical rib 24a that protrudes from the back surface 22 of the bumper body 2, and a horizontal rib 24b that extends toward the protruding direction (Y2-direction side) of the bracket 21 along an upper surface 21a of the bracket 21 from a lower end of the vertical rib 24a. The rigidity of the bracket 21 is enhanced by the reinforcing ribs 24.

A fastening hole 25 for clip-fastening the cover part 31 of the sensor supporting member 3 is formed to pass through the bracket 21 in an upward-downward direction (Z direction) at a position closer to a tip side (Y2-direction side) of the bracket 21 than a tip part (a tip part on the Y2-direction side) of the horizontal rib 24b, at a central part of the bracket 21. The formation position of the fastening hole 25 is set to a position where the dimension between the center position of the fastening hole 25 and a tip portion of the bracket 21 is a predetermined dimension (a dimension T1 in FIGS. 1 and 2).

Sensor Supporting Member

The sensor supporting member 3 is a member for supporting various kinds of sensors (corner sensors and the like) provided in the rear bumper 1, and is assembled to the back surface 22 side of the bumper body 2. The sensor supporting member 3 includes a body part 32 and the cover part 31.

The body part 32 is a plate-shaped portion that extends in the vertical direction. An opening 32a is formed at a predetermined position in the body part 32 in order to reduce the weight of the body part 32. Although not illustrated, sensor attachment parts for attaching the sensors are provided at a plurality of positions of the body part 32.

The cover part 31 is disposed at a position corresponding to the formation position of the bracket 21 of the bumper body 2 at an upper end edge of the body part 32, and is a portion that assembles the sensor supporting member 3 to the bumper body 2 by being clip-fastened to the bracket 21.

Figure 3:
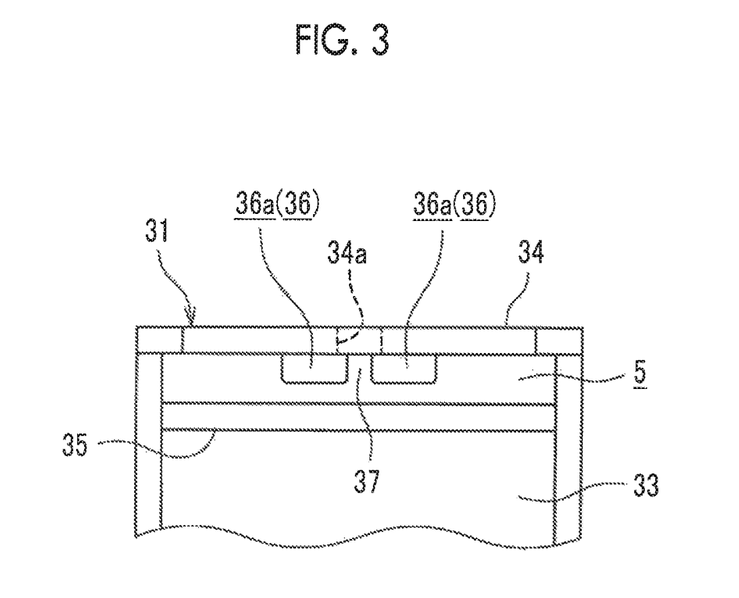
FIG. 3 is a view, as seen in the direction of arrow III in FIG. 1, illustrating the cover part of the sensor supporting member.
Figure 4:
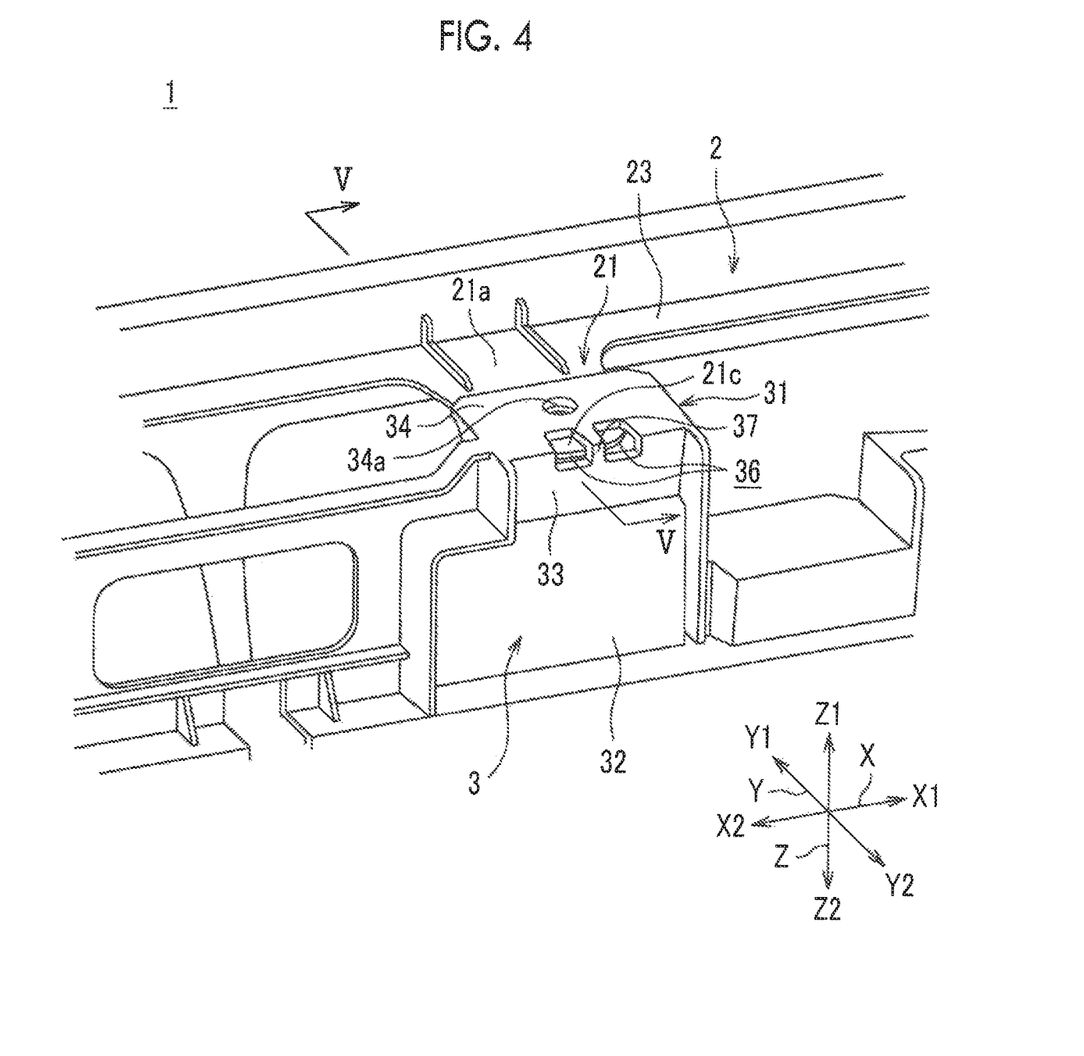
FIG. 4 is a perspective view illustrating a state where the bracket of the bumper body is inserted up to the predetermined insertion position of the cover part of the sensor supporting member.

The cover part 31 includes a vertical plate part 33 (in the present disclosure, a first plate part that extends in a direction orthogonal to an insertion direction of the bracket with respect to the internal space of the cover part) as also illustrated in FIGS. 3 (a view, as seen in the direction of arrow III in FIG. 1, illustrating the cover part 31), and FIG. 4 (a perspective view illustrating a state where the bracket 21 of the bumper body 2 is inserted up to the predetermined insertion position of the cover part 31 of the sensor supporting member 3), and a horizontal plate part 34 (in the present disclosure, a second plate part that extends parallel to the insertion direction in which the bracket is inserted into the internal space from the tip part of the first plate part and that overlaps an outer surface of the bracket in a state where the cover part covers the bracket). The horizontal plate part overlaps the upper surface 21a (an outer surface located on the Z1-direction side) of the bracket 21 in a state where the horizontal plate part extends in a direction (Y1-direction side) toward the bumper body 2 from an upper end part (a tip part on the Z1-direction side) of the vertical plate part 33 and the bracket 21 is inserted up to the predetermined insertion position of the cover part 31. The cover part 31 includes a supporting plate part 35 that faces a lower surface 21b (an outer surface located on the Z2-direction side) of the bracket 21 in a state where the cover part extends in a direction (Y1-direction side) toward the bumper body 2 from the lower position with a predetermined dimension with respect to an upper end part (a tip part on the Z1-direction side) of the vertical plate part 33 and the bracket 21 is inserted up to the predetermined insertion position of the cover part 31.

Figure 5:
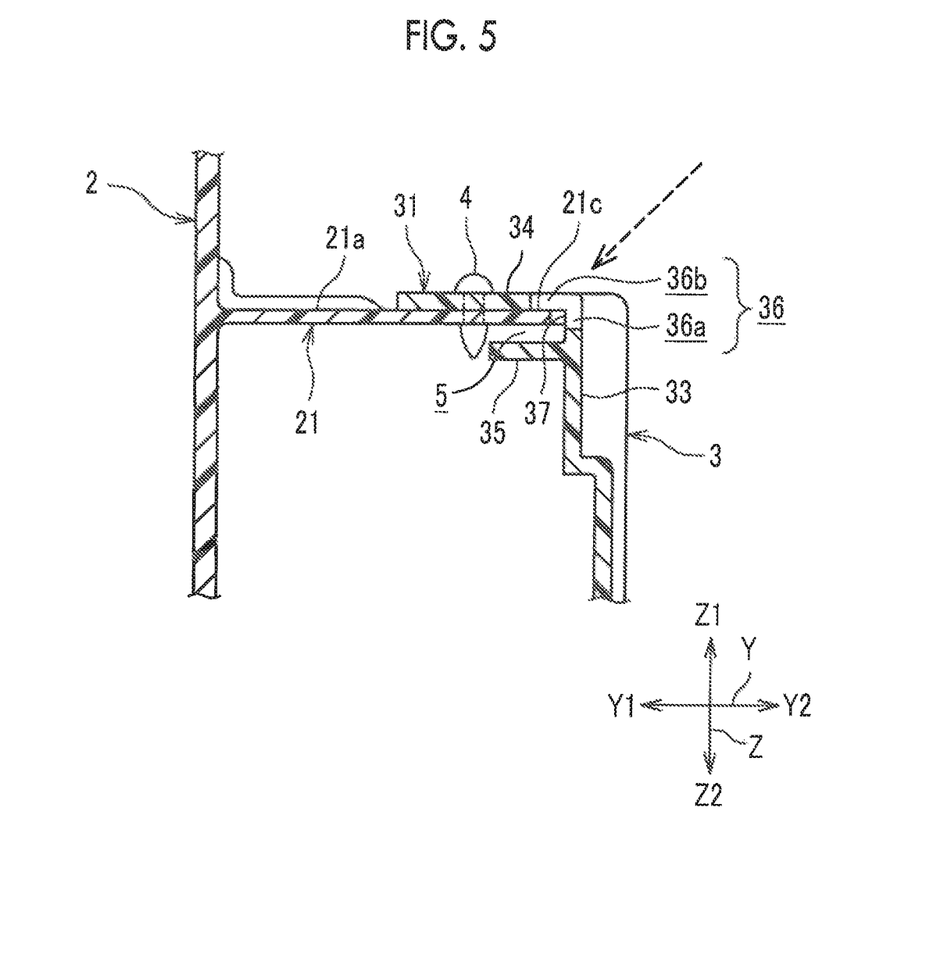
FIG. 5 is a sectional view taken along line V-V in FIG. 4, and is a view illustrating a state where the sensor supporting member is clip-fastened to the bumper body.

The depth dimension (the dimension in the Y direction) of the horizontal plate part 34 is set to be slightly shorter than a protruding dimension (a protruding dimension from the horizontal flange part 23 to the Y2-direction side) of the bracket 21. The same fastening hole 34a is formed at a central part of the horizontal plate part 34 so as to correspond to the fastening hole 25 formed in the bracket 21. The formation position of the fastening hole 34a is set to a position where the dimension (a dimension T2 in FIG. 2) between the center position of the fastening hole 34a and an inner surface (an inner surface that faces the Y1-direction side) of the vertical plate part 33 substantially coincides with the dimension T1 between the center position of the fastening hole 25 in the bracket 21 and the tip portion of the bracket 21. For this reason, the fastening hole 25 formed in the bracket 21 and the fastening hole 34a formed in the horizontal plate part 34 of the cover part 31 are aligned with each other in a state where the bracket 21 is inserted into the internal space 5 of the cover part 31 and the tip portion of the bracket 21 abuts against an inner surface of the vertical plate part 33 of the cover part 31 (specifically, a state where the bracket abuts against an abutment part 37 to be described below) as illustrated in FIGS. 4 and 5 (a sectional view taken along line V-V in FIG. 4 and a view illustrating a state where the sensor supporting member 3 is clip-fastened to the bumper body 2). That is, the fastening holes 25, 34a are disposed in a mutually aligned state in a state where the aforementioned bracket 21 is inserted up to the predetermined insertion position of the cover part 31.

The supporting plate part 35 extends parallel to the horizontal plate part 34 below the horizontal plate part 34. The supporting plate part 35 is disposed at a position with a spacing dimension slightly larger than the plate thickness dimension of the bracket 21 between the supporting plate part and the horizontal plate part 34. As mentioned above, the internal space 5 (the internal space 5 into which the bracket 21 is inserted) of the cover part 31 is formed between the horizontal plate part 34, the supporting plate part 35, and the vertical plate part 33. The protruding dimension (the dimension in the Y direction) of the supporting plate part 35 is set to be shorter than the dimension of the horizontal plate part 34 in the Y direction. Specifically, a tip position (a tip position on the Y1-direction side) of the supporting plate part 35 is set to a position (a position on the Y2-direction side) that recedes from a lower side of the fastening hole 34a formed in the horizontal plate part 34. That is, the supporting plate part 35 is disposed at a position where the lower side of the fastening hole 34a is not covered.

As a feature of the present embodiment, openings 36 are provided in the cover part 31 of the sensor supporting member 3.

The openings 36 are formed from the vertical plate part 33 to the horizontal plate part 34. That is, the openings 36 are configured such that an opening 36a (see FIG. 2) passing through the vertical plate part 33 in its thickness direction (the horizontal direction; the Y direction) of and the opening 36b passing through the horizontal plate part 34 in its thickness direction (the vertical direction; the Z direction) of are formed as continuous openings.

As illustrated in FIG. 2, the opening 36a formed in the vertical plate part 33 is formed within a range of from an upper end (a tip on the Z1-direction side) of the vertical plate part 33 to a position near the arrangement position of the supporting plate part 35. The opening 36b formed in the horizontal plate part 34 has a predetermined length in the Y direction from a base end (a tip on the Y2-direction side) of the horizontal plate part 34. The length of the opening 36b is set to be shorter than the length of the supporting plate part 35 in the Y direction. That is, an end part of the opening 36b in the Y1-direction side is located closer to the Y2-direction side than an end part of the supporting plate part 35 on the Y1-direction side (recedes to the Y2-direction side). The reason is to keep a portion of the bracket 21 from being viewed through the openings 36 in a case where the bracket 21 is located below the supporting plate part 35 without being inserted into the internal space 5 of the cover part 31 up to the predetermined insertion position.

As mentioned above, the openings 36 are provided at a position corresponding to the tip portion 21c of the bracket 21 in a state (a state illustrated in FIG. 4) where the bracket 21 of the bumper body 2 is inserted into the internal space 5 of the cover part 31 up to the predetermined insertion position and at a position where the tip portion 21c of the bracket 21 is allowed to be viewed from the outside of the cover part 31, in the cover part 31 of the sensor supporting member 3.

The openings 36 are not provided at center portions of the vertical plate part 33 and the horizontal plate part 34 in the rightward-leftward direction (X direction), and are respectively provided at both outer right and left positions of the center portions. As mentioned above, the center portion of the vertical plate part 33 in the rightward-leftward direction (X direction) is constituted as the abutment part 37 against which the bracket 21 of the bumper body 2 abuts in a case where the tip portion of the bracket 21 is inserted up to the predetermined insertion position of the cover part 31. That is, the openings 36 are provided at both the outer positions (both the outer positions in the direction orthogonal to the insertion direction of the bracket 21) of the abutment part 37 in the vertical plate part 33.

Assembling Work of Cover Part

The assembling work for assembling the sensor supporting member 3 to the bumper body 2 is described.

In the assembling work, the sensor supporting member 3 is combined with the bumper body 2 such that the bracket 21 of the bumper body 2 is inserted into the internal space 5 of the cover part 31 of the sensor supporting member 3 up to the predetermined insertion position. In this case, as illustrated in FIGS. 4 and 5, as the bracket 21 is inserted up to a position where the tip portion of the bracket 21 abuts against the abutment part 37 of the vertical plate part 33 of the cover part 31, the bracket 21 is inserted up to the predetermined insertion position (a predetermined position where that the sensor supporting member 3 is allowed to be attached to the bumper body 2) of the cover part 31. In a state where the bracket 21 is inserted into the internal space 5 of the cover part 31 up to the predetermined insertion position, the tip portion 21c of the bracket 21 abuts against both the outer portions of the openings 36 provided in the cover part 31. As a result, a worker can view the tip portion 21c of the bracket 21 through the openings 36 from the outside of the cover part 31 (a dashed-line arrow in FIG. 5 indicates the direction of a worker's sight line). That is, it is possible to easily check that the bracket 21 is appropriately inserted into the internal space 5 of the cover part 31 (the bracket 21 is not located below the supporting plate part 35). On the contrary, in a case where the tip portion 21c of the bracket 21 cannot be viewed through the openings 36 from the outside of the cover part 31, it is possible to determine that the bracket 21 is not inserted into the internal space 5 of the cover part 31 up to the predetermined insertion position and the relative position of the sensor supporting member 3 with respect to the bumper body 2 is not appropriately obtained. In this case, the relative position of the cover part 31 with respect to the bumper body 2 is adjusted such that the relative position of the sensor supporting member 3 with respect to the bumper body 2 is appropriately obtained (the tip portion 21c of the bracket 21 can be viewed through the openings 36 from the outside the cover part 31).

As mentioned above, in the present embodiment, the worker can easily determine whether or not the bracket 21 of the bumper body 2 is appropriately inserted into the internal space 5 of the cover part 31 of the sensor supporting member 3 by viewing (whether or not the relative position of the sensor supporting member 3 with respect to the bumper body 2 is appropriately obtained).

As mentioned above, the fastening hole 25 formed in the bracket 21 and the fastening hole 34a formed in the horizontal plate part 34 of the cover part 31 are aligned with each other in a state where the relative position of the cover part 31 with respect to the bumper body 2 is appropriately obtained and the bracket 21 is inserted up to the predetermined insertion position (the position where the bracket abuts against the abutment part 37) of the cover part 31. That is, the fastening holes 25, 34a are brought into a state where the fastening holes communicate with each other in the vertical direction. In the above-mentioned state, by inserting a clip 4 (refer to FIG. 5) from the upper side, the cover part 31 of the sensor supporting member 3 is fastened to the bracket 21 of the bumper body 2. That is, the sensor supporting member 3 is assembled to the bumper body 2.

Since the supporting plate part 35 is disposed at the position where the lower side of the fastening hole 34a is not covered as mentioned above during the insertion work of the clip 4, the supporting plate part 35 does not become an obstacle to the work of inserting the clip 4. There is a possibility that the bracket 21 is deflected downward due to a pushing force to the clip 4. However, even when the supporting plate part 35 is present below the bracket 21 and the bracket 21 is deflected downward, the downward deflection of the bracket is suppressed by the supporting plate part 35 as the bracket 21 abuts against the supporting plate part 35. For this reason, the insertion of the clip 4 into the respective fastening holes 25, 34a can be excellently performed. That is, it is possible to suppress a situation in which the bracket 21 is largely deflected downward and the clip 4 cannot be inserted into the fastening hole 25 of the bracket 21.

By assembling the sensor supporting member 3 to the bumper body 2 as mentioned above, the "component assembled part in which the first component and the second component are assembled to each other in a state where the bracket provided in the first component is inserted up to the predetermined insertion position of the cover part that is provided in the second component to cover the bracket from a front side of the bracket to a back side thereof" in the present disclosure is configured.

As mentioned above, in the present embodiment, by providing the cover part 31 with the openings 36 allowing the tip portion 21c of the bracket 21 inserted into the internal space 5 of the cover part 31 up to the predetermined insertion position to be viewed from the outside of the cover part 31, whether or not the bracket 21 is appropriately inserted into the internal space 5 of the cover part 31 can be easily determined, and it is possible to easily determine whether or not the relative position of the sensor supporting member 3 with respect to the bumper body 2 is appropriately obtained.

In the present embodiment, when the bracket 21 is inserted up to the predetermined insertion position of the cover part 31, the fastening holes 25, 34a that are respectively formed the bracket 21 and the cover part 31 are brought into a mutually aligned state. For this reason, by viewing the tip portion 21c of the bracket 21 through the openings 36 of the cover part 31 and inserting the bracket 21 until the tip portion 21c of the bracket 21 reaches the predetermined insertion position of the cover part 31, the fastening holes 25, 34a can be aligned with each other, and the aforementioned alignment work can be simplified.

In the present embodiment, the openings 36 are formed from the vertical plate part 33 to the horizontal plate part 34 in the cover part 31. For this reason, it is possible to view the tip portion 21c of the bracket 21 through the openings 36 from any direction of a side (horizontal direction side) where the vertical plate part 33 is disposed and a side (upper side) where the horizontal plate part 34 is disposed, and the visibility of the tip portion 21c of the bracket 21 in a case where the bracket 21 is appropriately inserted into the internal space 5 of the cover part 31 can be enhanced.

In the present embodiment, when the bracket 21 is inserted up to the predetermined insertion position of the cover part 31, the tip portion of the bracket 21 abuts against the abutment part 37 of the vertical plate part 33, and thereby, the insertion position of the bracket 21 is positioned, and the worker views the tip portion 21c of the bracket 21 through the openings 36 disposed at both the outer positions of the abutment part 37. As a result, it is possible to check that the bracket 21 is inserted up to the predetermined insertion position of the cover part 31. That is, during the work of assembling the sensor supporting member 3 to the bumper body 2, the bracket 21 reaches the predetermined insertion position of the cover part 31 by inserting the bracket 21 until the tip portion of the bracket 21 abuts against the abutment part 37 of the vertical plate part 33. Hence, whether or not the bracket reaches the predetermined insertion position of the cover part can be checked by viewing through the openings 36. For this reason, the reliability of the bracket 21 being inserted up to the predetermined insertion position of the cover part 31 can be enhanced.

Modification Example 1

Modification Example 1 will be described. The present modification example is different from the above embodiment in terms of the structure of the openings 36 of the cover part 31. Since the other structure is the same as that of the above embodiment, the structure of the openings 36 will mainly be described.

Figure 6:
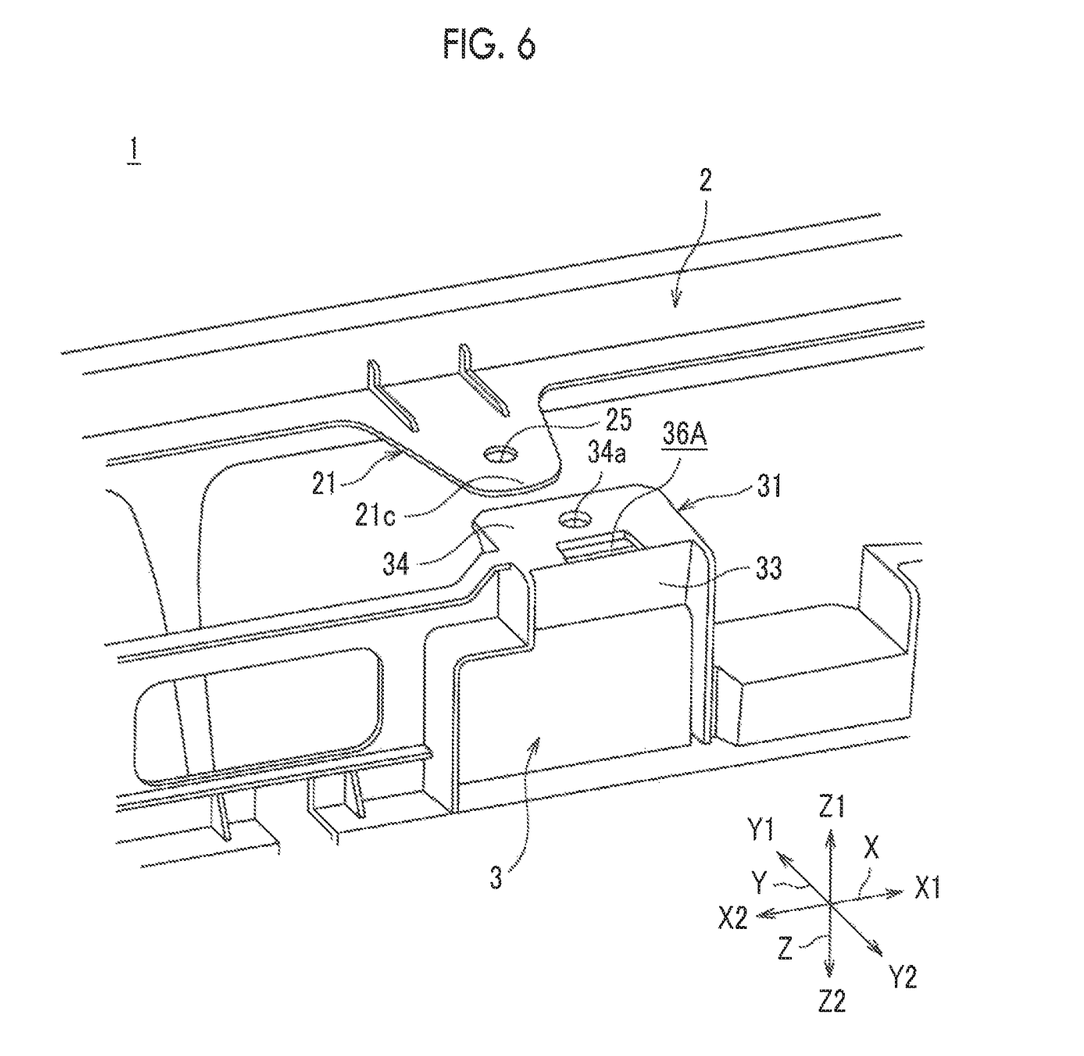
FIG. 6 is an equivalent view of FIG. 1 in Modification Example 1.

FIG. 6 is an equivalent view of FIG. 1 in the present modification example. As illustrated in FIG. 6, in the present modification example, a position of the cover part 31 where an opening 36A is provided is solely the horizontal plate part 34 of the cover part 31. That is, no opening is provided in the vertical plate part 33.

The structure of the present modification example is applied to a case where a worker's sight line during the assembling work of the sensor supporting member 3 to the bumper body 2 is from the upper side. That is, as the worker views the tip portion 21c of the bracket 21 through the opening 36A from the upper side, whether or not the bracket 21 is appropriately inserted into the internal space 5 of the cover part 31 can be easily determined.

According to the structure of the present modification example, no opening is provided in the vertical plate part 33. Therefore, it is possible to easily determine whether or not the bracket 21 is appropriately inserted into the internal space 5 of the cover part 31 while increasing the rigidity of the cover part 31.

Modification Example 2

Modification Example 2 will be described. The present modification example is also different from the above embodiment in terms of the structure of the openings 36 of the cover part 31. Since the other structure is the same as that of the above embodiment, the structure of the openings 36 will mainly be described.

Figure 7:
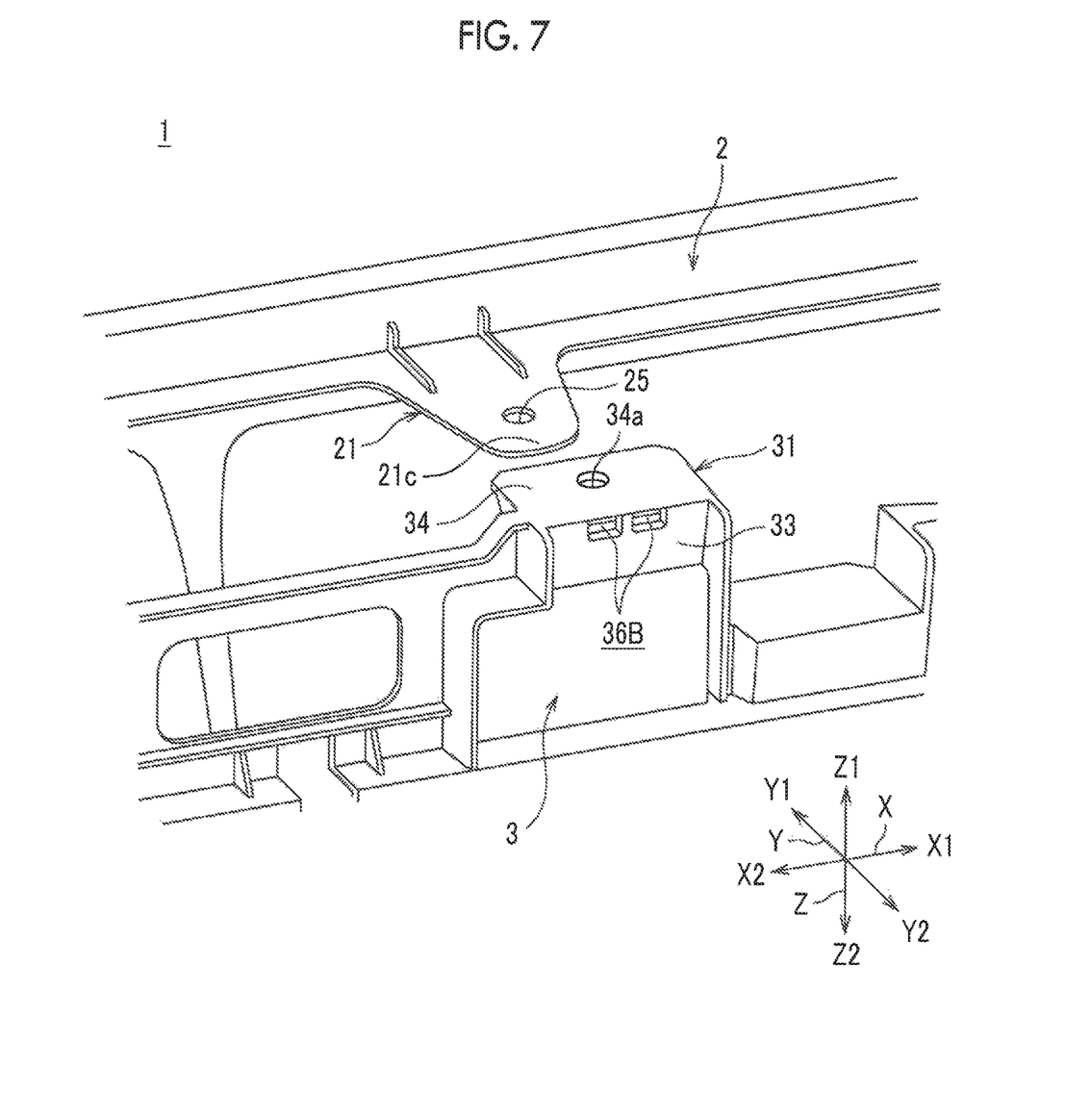
FIG. 7 is an equivalent view of FIG. 1 in Modification Example 2.

FIG. 7 is an equivalent view of FIG. 1 in the present modification example. As illustrated in FIG. 7, in the present modification example, a position of the cover part 31 where openings 36B are provided is solely the vertical plate part 33 of the cover part 31. That is, no opening is provided in the horizontal plate part 34.

The structure of the present modification example is applied to a case where a worker's sight line during the assembling work of the sensor supporting member 3 to the bumper body 2 is from the horizontal direction side. That is, as the worker views the tip portion 21c of the bracket 21 through the openings 36B from the horizontal direction side, whether or not the bracket 21 is appropriately inserted into the internal space 5 of the cover part 31 can be easily determined.

According to the structure of the present modification example, no opening is provided in the horizontal plate part 34. Therefore, it is possible to easily determine whether or not the bracket 21 is appropriately inserted into the internal space 5 of the cover part 31 while increasing the rigidity of the cover part 31.

Modification Example 3

Modification Example 3 will be described. The present modification example is different from the above embodiment in terms of the shape of the bracket 21 and the structure of the openings 36 of the cover part 31. Since the other structure is the same as that of the above embodiment, the shape of the bracket 21 and the structure of the openings 36 will mainly be described.

Figure 8:
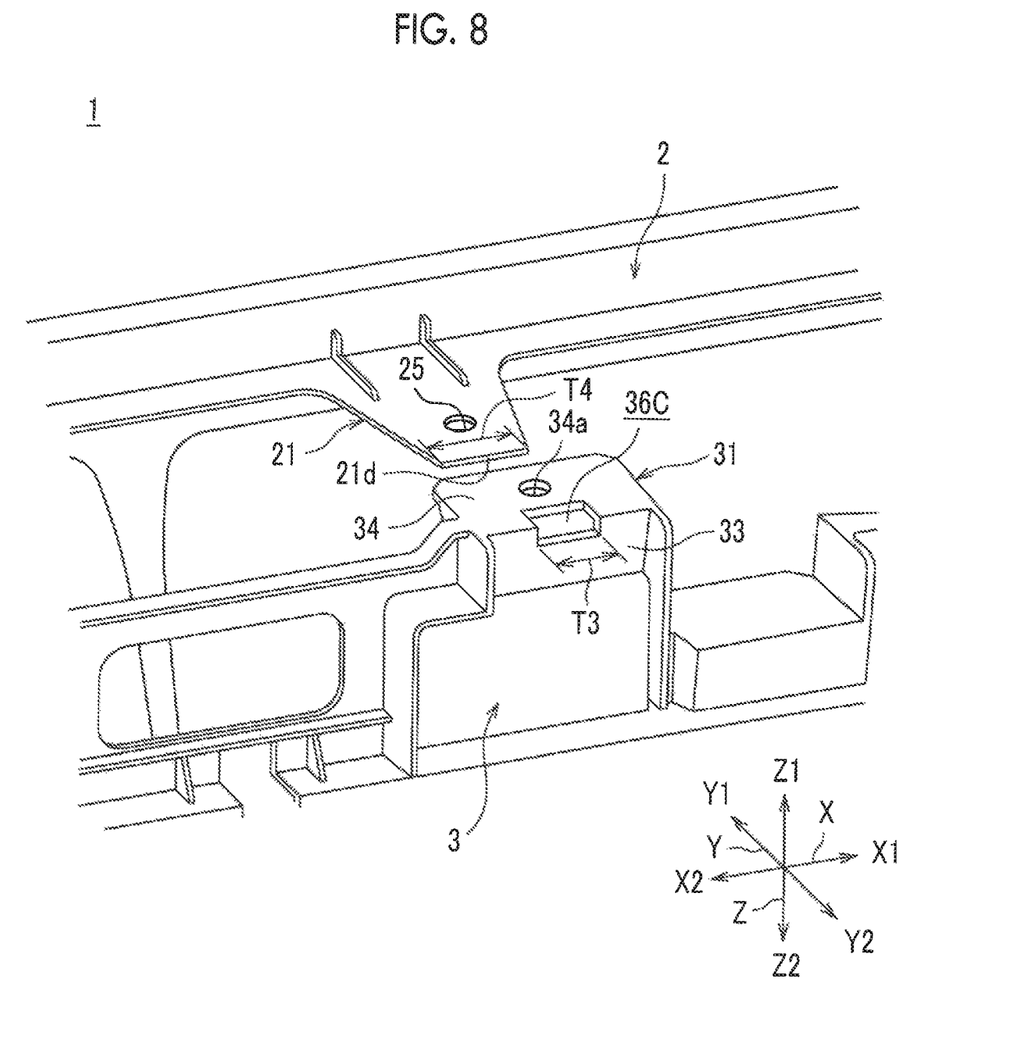
FIG. 8 is an equivalent view of FIG. 1 in Modification Example 3.

FIG. 8 is an equivalent view of FIG. 1 in the present modification example. As illustrated in FIG. 8, in the present modification example, a tip portion 21d of the bracket 21 has a linear shape that extends in the direction (X direction) orthogonal to the insertion direction of the bracket 21 with respect to the internal space 5 of the cover part 31. That is, the shape of the bracket 21 in a plan view is the substantially trapezoidal shape. The width dimension (a dimension T3 in FIG. 8 in a direction along the tip portion 21d of the bracket 21) of an opening 36C formed in the cover part 31 is set to be shorter than the width dimension (a dimension T4 in FIG. 8) of the tip portion 21d of the bracket 21.

According to the structure of the present modification example, when the bracket 21 is inserted up to the predetermined insertion position of the cover part 31, both the end portions (both the end portions in the X direction) of the tip portion 21d of the bracket 21 abut against both the outer portions (both the outer portions in the X direction) of the opening 36C in the vertical plate part 33 of the cover part 31, and thereby, the insertion position of the bracket 21 is positioned, and the worker views the tip portion 21c of the bracket 21 through the opening 36C. As a result, it is possible to check whether or not the bracket 21 is inserted up to the predetermined insertion position of the cover part 31. That is, also in the present modification example, similar to the above embodiment, during the work of assembling the sensor supporting member 3 to the bumper body 2, the bracket 21 reaches the predetermined insertion position of the cover part 31 by inserting the bracket 21 until the tip portion 21d of the bracket 21 abuts against the vertical plate part 33 of the cover part 31. Hence, whether or not the bracket reaches the predetermined insertion position of the cover part can be checked by viewing through the openings 36C.

Other Embodiments

The present disclosure is not limited to solely the above embodiment and the respective modification examples, and all modifications and applications encompassed within the scope of the claims and a range equivalent to the above range are possible.

For example, in the above embodiment and the above respective modification examples, the case where the present disclosure is applied to the portion in which the sensor supporting member 3 is assembled to the bumper body 2, in the rear bumper 1 provided in an automobile, has been described. The present disclosure is not limited to this, and can be applied to component assembled parts in various goods formed by assembling the first component and the second component to each other in a state where the bracket provided in the first component is inserted up to the predetermined insertion position of the cover part that is provided in the second component to cover the bracket from the front side of the bracket to the back side thereof.

In the present embodiment, the two openings 36 are formed from the vertical plate part 33 to the horizontal plate part 34 in the cover part 31. In the present disclosure, the number of the openings 36 is not particularly limited.

In the above embodiment and the above respective modification examples, the number of positions of the cover part 31 clip-fastened to the bracket 21 is one. In the present disclosure, the number of clip-fastened positions is not particularly limited.

In the above embodiment and the above respective modification examples, the case where the sensor supporting member 3 is assembled to the bumper body 2 from a side has been described as an example. An applicable embodiment of the present disclosure is not limited to this, and can also be applied to a structure in which the sensor supporting member 3 is assembled to the bumper body 2 from above, and a structure in which the sensor supporting member 3 is assembled to the bumper body 2 from below.

In the above embodiment and the above respective modification examples, the sensor supporting member 3 is clip-fastened to the bumper body 2. The applicable embodiment of the present disclosure is not limited to this, and fastening may be performed by other means, such as screw fastening.

The present disclosure can be applied to a structure of a component assembled part in which a sensor supporting member is assembled to a bumper body in a state where a bracket provided in the bumper body is inserted into a cover part provided in the sensor supporting member.

What is claimed is:

1. A structure of a component assembled part, the structure comprising:
   a bracket provided in a first component; and
   a cover part provided in a second component, wherein:
   the cover part includes an internal space configured such that the bracket is inserted into the internal space of the cover part from a side of the internal space up to a predetermined insertion position within the internal space of the cover part so that the cover part covers the bracket from a front side of the bracket to a back side of the bracket when the first component and the second component are assembled to each other;
   the cover part includes an opening, which allows the internal space of the cover part and an outside of the cover part to communicate with each other, at a position corresponding to a tip portion of the front side of the bracket in a state where the bracket is inserted into the internal space of the cover part up to the predetermined insertion position of the cover part; and
   the tip portion of the front side of the bracket is accommodated in the internal space of the cover part and abuts against the opening of the cover part when the bracket is inserted into the internal space of the cover part so that at least a part of the tip portion of the front side of the bracket can be seen from the outside of the cover part through the opening.

2. The structure according to claim 1, wherein:
   the bracket and the cover part include fastening holes, respectively; and
   the fastening hole of the bracket and the fastening hole of the cover part are disposed so as to be aligned with each other in a state where the bracket is inserted up to the predetermined insertion position of the cover part.

3. The structure according to claim 1, wherein:
   the cover part includes a first plate part that extends in a direction orthogonal to an insertion direction of the bracket with respect to the internal space of the cover part, and a second plate part that extends parallel to the insertion direction in which the bracket is inserted into the internal space from a tip part of the first plate part and that overlaps an outer surface of the bracket in a state where the cover part covers the bracket; and
   the opening is disposed in at least one of the first plate part and the second plate part.

4. The structure according to claim 3, wherein:
   the first plate part includes an abutment part against which the tip portion of the front side of the bracket abuts when the bracket is inserted up to the predetermined insertion position of the cover part; and
   the opening includes two openings that are disposed at both outer positions of the abutment part of the first plate part with respect to a direction orthogonal to the insertion direction of the bracket.

5. The structure according to claim 3, wherein:
   the first plate part includes an abutment part against which the tip portion of the front side of the bracket abuts when the bracket is inserted up to the predetermined insertion position of the cover part;
   the tip portion of the front side of the bracket is configured to have, in a linear shape, a predetermined width dimension in the direction orthogonal to the insertion direction of the bracket with respect to the internal space of the cover part; and
   a width dimension of the opening in the direction orthogonal to the insertion direction of the bracket is shorter than the predetermined width dimension of the tip portion of the front side of the bracket in the direction orthogonal to the insertion direction of the bracket.

* * * * *